(12) United States Patent
Sahagun

(10) Patent No.: US 12,276,092 B2
(45) Date of Patent: Apr. 15, 2025

(54) SYSTEM AND METHOD FOR PROVIDING WATER CONSERVATION

(71) Applicant: Miguel Cuellar Sahagun, Moreno Valley, CA (US)

(72) Inventor: Miguel Cuellar Sahagun, Moreno Valley, CA (US)

( * ) Notice: Subject to any disclaimer, the term of this patent is extended or adjusted under 35 U.S.C. 154(b) by 815 days.

(21) Appl. No.: 17/525,912

(22) Filed: Nov. 14, 2021

(65) Prior Publication Data

US 2022/0282462 A1 Sep. 8, 2022

Related U.S. Application Data

(60) Provisional application No. 63/155,928, filed on Mar. 3, 2021.

(51) Int. Cl.
*E03B 7/02* (2006.01)
*E03B 7/07* (2006.01)

(52) U.S. Cl.
CPC ............. *E03B 7/02* (2013.01); *E03B 7/075* (2013.01)

(58) Field of Classification Search
CPC ... E03B 1/041; E03B 7/02; E03B 7/07; E03B 7/075; A01G 25/16; A62C 35/00; A62C 35/68; A62C 35/60; A62C 3/02; A62C 3/0214; A62C 37/44; A62C 99/0072
See application file for complete search history.

(56) References Cited

U.S. PATENT DOCUMENTS

| 8,191,307 | B2 | 6/2012 | Donoghue et al. |
| 2004/0168992 | A1 | 9/2004 | Ben-Amotz |
| 2010/0126233 | A1 | 5/2010 | Okros |
| 2014/0290967 | A1 * | 10/2014 | Kirn ............... A62C 35/00 137/15.01 |
| 2018/0078801 | A1 * | 3/2018 | Perkovich ......... A62C 35/68 |
| 2019/0085535 | A1 | 3/2019 | Huang |

FOREIGN PATENT DOCUMENTS

WO    WO-2021021240 A1 *  2/2021  ............ A01G 25/16

\* cited by examiner

*Primary Examiner* — Christopher R Dandridge
(74) *Attorney, Agent, or Firm* — L/O ALEXIS J SAENZ

(57) ABSTRACT

System and method for implementing water conservation is disclosed. The water conservation system may comprise a plurality of solenoid valves, a plurality of water outlet points, one or more grey water tanks, a city water source, water pumps, timers, and a plurality of sensors. The sensors may include water level detection sensors, temperature detection sensors, solenoid valve sensors, pump control sensors, and the like. A control unit comprising a memory and a processor may be configured to control the working of the water conservation system. Data received from various components and sensors are processed to determine an operation to be performed by the system. The operations include fire control, excess grey water removal, or standard irrigation. The control unit activates a combination of solenoid valves and pumps to route water from grey water tanks and/or city water source depending upon the operation to be performed.

16 Claims, 5 Drawing Sheets

SYSTEM AND METHOD FOR PROVIDING WATER CONSERVATION

CROSS-REFERENCE TO RELATED APPLICATIONS

This application claims benefit of U.S. Provisional Application Ser. No. 63/155,928 entitled "Techniques of control to effectively utilize grey water", filed Mar. 3, 2021, which is incorporated herein in its entirety.

TECHNICAL FIELD

The present invention relates generally to water management. More particularly, the present invention relates to efficient storage, management, and disbursal of grey water.

BACKGROUND

While almost two-thirds of the earth is covered in water, the percentage of fresh water that can be used by humans for various activities is minimal. The distribution of water on the earth's surface is extremely uneven. Only 3% of water on the surface is fresh; the remaining 97% resides in the ocean. The distribution of fresh water is uneven as well with 69% residing in glaciers, 30% underground, and less than 1% in lakes, rivers, and swamps. To sum up, only 1% percent of the water on the Earth's surface is usable by humans. More than 7.5 billion humans and trillions of other living beings (except those which live in the oceans) depend solely on 1% of fresh water.

While it is a well-established fact that water is precious right from ancient times, humans have habituated to indulge in over utilization of water at times when there is no scarcity. With the advent of industrialization and the invention of various machines that can efficiently pump water from deep under the ground, water usage and wastage have risen exponentially. Moreover, with wider water supply system that has is improving its efficiency and availability each day, ground water levels are drastically decreasing in many places, especially in urban areas. While the scale in which water is consumed by industries and factories are very large, usage by individuals sometimes even overshadow industrial usage because of rise in population and urbanization. Today, many urban areas in the developed and developing world face acute to severe water shortage during summers depending upon their geographic location and rain pattern. This number is consistently rising each year with increased population shift from rural to urban localities.

The problem regarding water shortage has been widely accepted throughout the world. Hence, several scientists and innovators have proposed various techniques for preserving fresh water. While one methodology focusses on using apparatuses that create behavioral changes in humans, other focus more on recycling wastewater in addition to conservation of fresh water.

U.S. Pat. No. 8,191,307B2 discloses a system and a method for harvested water irrigation. The irrigation system generally collects harvested water from a variety of sources and disperses it from a tank to a landscape for irrigation. The irrigation may be managed using a system controller. The system controller interacts with a variety of devices, including a level controller, a pump or valve, and at least one zone valve. The system may be configured to end irrigation cycles in response to certain events and to supplement harvested water irrigation with potable water as needed or selected.

US20040168992A1 discloses a water recycling solution for gray water, which may include upper and lower water tanks placed at high and low points, respectively, of for example a building or residence. Piping and valves (which may be low pressure) may be incorporated to enable efficient low-pressure water flow throughout the system. Mechanical filters and/or traps, colorants and anti-bacterial chemicals etc. may be utilized to, for example, prevent clogging and reduce contaminants within the gray water utilized.

US20100126233A1 discloses a fully electronic grey water reusing washing machine recycling the greywater produced in the household for toilet flushing, which replaces the mechanical technical solution using mechanically moving parts as floating buoys provided with actuating shafts as its immediate antecedent forerunner by a completely electronically functioning technical solution, wherein the ECU of the washing machine carries out the tasks of storing, treating and feeding the greywater to flush the toilet by commanding electronic water valves on basis of the signals received from the electronic water sensors mounted in the greywater and freshwater tanks respectively, while using one single greywater tank on the washer.

US20190085535A1 discloses a water conservation system for use in a building comprises a water supply pipe, water-consuming equipment, a water-consuming equipment outlet pipe, an intermediate water inlet pipe, an intermediate water collection pipe, an intermediate water outlet pipe, an intermediate water outlet valve, an intermediate water overflow pipe, and a sewage pipe. The intermediate water collection pipe is installed in the building, and a water inlet and outlet of the intermediate water collection pipe is pre-arranged at every floor. The intermediate water outlet pipe and the intermediate water inlet pipe communicates with the water inlets and outlets of the intermediate water collection pipe, respectively. The intermediate water outlet pipe communicates with a toilet water tank. A first check valve is disposed on the intermediate water inlet pipe.

While the prior arts disclose various techniques for reusing and recycling wastewater, they are more specific to usage within a building. While some prior arts focus on re-routing laundry waste to toilets, other focus on indoor management of grey water. Furthermore, a practical solution that automates the process of switching between usage of fresh water and grey water using novel technological solutions is missing in the prior arts.

The present disclosure proposes such an automated system that takes care of wastewater management for indoor as well as outdoor usage efficiently. A comprehensive solution that overcomes the disadvantages of the prior arts and the above-mentioned problems are being addressed by the present disclosure.

SUMMARY OF THE INVENTION

In light of the disadvantages mentioned in the previous section, the following summary is provided to facilitate an understanding of some of the innovative features unique to the present invention and is not intended to be a full description. A full appreciation of the various aspects of the invention can be gained by taking the entire specification and drawings as a whole.

Embodiments described herein discloses a method and a system for conservation of water. The water conservation system disclosed herein may comprise a plurality of solenoid valves, a plurality of water outlet points, one or more grey water tanks, a city water source, water pumps, timers, and a plurality of sensors. The sensors may include water level detection sensors, temperature detection sensors, solenoid valve sensors, pump control sensors, and the like.

A control unit comprising a memory and a processor coupled to the memory may be configured to control the working of the water conservation system. The control unit may receive operating status of the plurality of solenoid valves, the plurality of water outlet points, and the water pumps at regular intervals. Further, the control unit may receive data generated by the timers and data generated by the plurality of sensors. The received operational status and data may be processed by the control unit to determine an operation to be performed by the control unit. The operations may include fire control, excess grey water removal, standard irrigation, and the like. Upon determining that the operation to be performed is fire control, the control unit determines a fire zone based on the data received from the temperature sensors and further routes water from the grey water tanks and the city water source to water outlet points disposed at the fire zone. This is performed by activating a first combination of solenoid valves and pumps.

Further, upon determining that the action to be performed is excess grey water removal, the control unit routes excess water from the grey water tanks to water outlet points located at an excess water removal zone by activating the corresponding solenoid valves and water pumps. Furthermore, upon determining that the action to be performed is standard irrigation, the control unit determines water levels in the one or more grey water tanks and a time period for irrigation based on the data received from the timers. Then, the control unit routes water from the one or more grey water tanks to the water outlets points closest to an irrigation zone for the determined time period by activating the corresponding solenoid valves and water pumps until water levels in the one or more grey water tanks is low. If the water level in the grey water tanks is determined to be low, the control unit routes water from the city water source to the water outlet points closest to the irrigation zone for the determined time period by activating the corresponding solenoid valves and water pumps.

This summary is provided merely for purposes of summarizing some example embodiments, to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following detailed description and figures.

The abovementioned embodiments and further variations of the proposed invention are discussed further in the detailed description.

Figure 1:
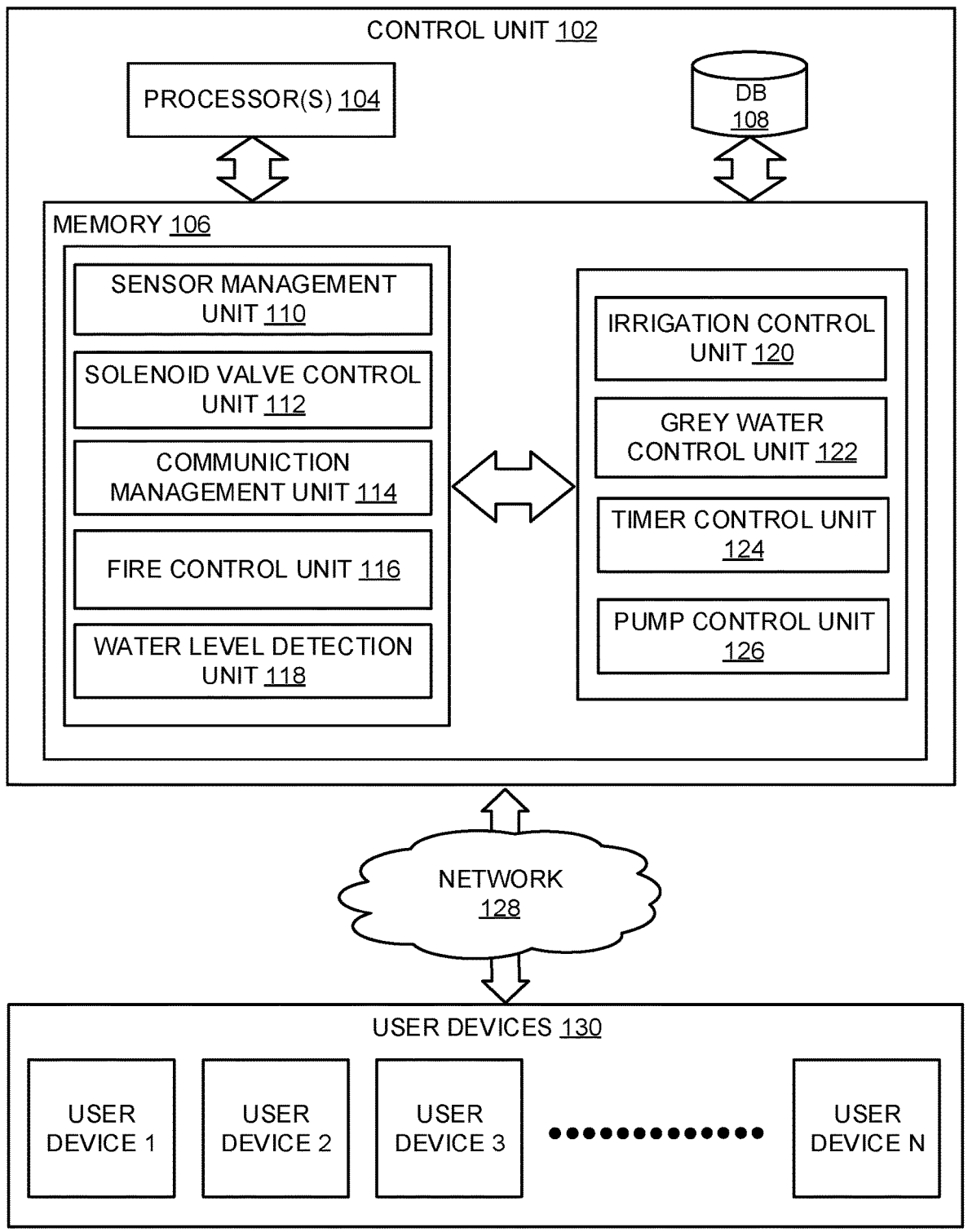
FIG. 1 is a block diagram describing an exemplary architecture of a control unit and connected devices for implementing a water conservation system according to the embodiments of the present disclosure.

The drawings described herein are for illustration purposes only and are not intended to limit the scope of the present subject matter in any way.

DETAILED DESCRIPTION

According to the embodiments of the present disclosure, a technique for implementing a water conservation is disclosed. The technique includes a system and an associated method for implementing water conservation. The water conservation system disclosed herein may comprise a plurality of solenoid valves, a plurality of water outlet points, one or more grey water tanks, a city water source, water pumps, timers, and a plurality of sensors. The sensors may include water level detection sensors, temperature detection sensors, solenoid valve sensors, pump control sensors, and the like. A control unit comprising a memory and a processor coupled to the memory may be configured to control the working of the water conservation system.

In the following description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments maybe utilized and that changes may be made without departing from the scope of the present invention. The following detailed description is, therefore, not to be taken in a limited sense, and the scope of the present invention is defined only by the appended claims.

The specification may refer to "an", "one" or "some" embodiment(s) in several locations. This does not necessarily imply that each such reference is to the same embodiment(s), or that the feature only applies to a single embodiment. A single feature of different embodiments may also be combined to provide other embodiments.

As used herein, the singular forms "a" "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the foregoing sections, some features are grouped together in a single embodiment for streamlining the disclosure. This method of disclosure is not to be interpreted as reflecting an intention that the disclosed embodiments of the present disclosure must use more features than are expressly recited in each claim. Rather, as the following claims reflect, the inventive subject matter lies in less than all features of a single disclosed embodiment. Thus, the following claims are hereby incorporated into the detailed description, with each claim standing on its own as a separate embodiment.

According to the embodiments of the present disclosure, the control unit may be configured to receive operating status of the plurality of solenoid valves, the plurality of water outlet points, and the water pumps at regular intervals. Further, the control unit may receive data generated by the timers and data generated by the plurality of sensors. Data is sent from the associated components to the control unit in real-time. The received data may be stored in the memory and/or the database associated with the control unit.

The operational status may include the current working status of each of the plurality of solenoid valves (whether they are in an active state or inactive state), current status of each of the plurality of water outlet points (whether water flow is present or absent), and working status of the water pumps. Furthermore, data from sensors are also received at regular intervals. The received data may include data received from the timers and data generated by the plurality of sensors. The timers may be programmed to store irrigation schedules. Connected user devices may be allowed to store irrigation schedules into the timers.

Herein, irrigation schedules may include the schedules at which each of the plurality of water outlet pipes disposed at the irrigation zones may be activated. It may further include the amount of time for which irrigation is to be performed. Irrigation schedules may further include dates and times at which irrigation is to be performed, amount of water that is to be disbursed from each of the plurality of water outlets at one or more irrigation zones, and the like. The control unit may receive this data from the timers at regular intervals and route water accordingly. Furthermore, data is received from the plurality of sensors in real-time as well. The plurality of sensors may include temperature sensors, water level sensors, solenoid valve sensors, pump control sensors, and the like.

The received operational status and received data may be processed by the control unit to determine an operation to be performed by the control unit. The operations may include fire control, excess grey water removal, standard irrigation, and the like. According to one embodiment of the present disclosure, the one operation may be prioritized over the other based on an emergency factor. That is, fire control operation may be prioritized over standard irrigation by considering the emergency factor associated to fire control. Moreover, users may be provided with options to override and/or force operations as well.

Upon determining that the operation to be performed is fire control, the control unit determines a fire zone based on the data received from the temperature sensors and further routes water from the grey water tanks and the city water source to water outlet points disposed at the fire zone. This is performed by activating a first combination of solenoid valves and pumps. Herein, the first combination of solenoid valves and water pumps may include solenoid valves connecting the water outlets disposed at the fire zone and water pumps connected to the one or more grey water tanks and the city water source. When the temperature sensors send data pointing out to high temperature at a particular zone, the control unit may classify that are as a fire zone. Further, the control unit determines the water outlet points in and around the fire zone. Furthermore, the control unit routes water from both the grey water tank and the city water source to the water outlet points around the fire zone by activating the associated pumps and solenoid valves. Upon determining that the temperature is back to normal, this operations may be stopped by the control unit.

Further, in a related embodiment of the present disclosure, upon determining that the action to be performed by the control unit is excess grey water removal, the control unit routes excess water from the grey water tanks to water outlet points located at an excess water removal zone by activating a second combination of solenoid valves and water pumps. Herein, the second combination of solenoid valves and water pumps may include solenoid valves connecting the water outlets disposed at the excess grey water removal zone and pumps connected to the one or more grey water tanks. The grey water tank may be equipped with sensors for determining water levels and the data from these sensors may be continuously transmitted to the control unit. Excess grey water may have to be removed from the grey water tank at times. To accommodate this, an excess grey water removal zone may be marked and excess grey water may be disposed via water outlets disposed at those areas.

Furthermore, upon determining that the action to be performed is standard irrigation, the control unit may determine water levels in the one or more grey water tanks and a time period for irrigation based on the data received from the timers. The irrigation schedule may be updated with the control unit to determine the operating schedule of water outlets points at each irrigation zone. The control unit may determine the amount of time each water outlet point at each irrigation zone is supposed to be open and the amount of water that is to be disposed from the relevant water outlet points. Upon determining the irrigation schedule, the control unit routes water from the one or more grey water tanks to the water outlets points disposed near the irrigation zones for the determined time period by activating the third combination of solenoid valves and water pumps until water levels in the one or more grey water tanks is low.

The third combination of solenoid valves and water pumps include solenoid valves connecting the water outlets disposed at the irrigation zone and pumps connected to the one or more grey water tanks. The system shall prefer water from the grey water tank for irrigation purpose unless specified otherwise by the user. Hence, water from grey water tanks may be used for irrigation at each irrigation points until the grey water tanks are empty. The water levels sensors may update the timer when the water level in the grey water tank is low. The timer may transmit this information to the control unit.

If the water level in the grey water tanks is determined to be low, the control unit routes water from the city water source to the water outlet points closest to the irrigation zone for the determined time period by activating the fourth combination of solenoid valves and water pumps. The fourth combination of solenoid valves and water pumps include solenoid valves connecting the water outlets disposed at the irrigation zone and pumps connected to the city water source. By using a combination of grey water and city water, the irrigation schedule is left uninterrupted while maximizing the scope of water conservation.

Referring to the figures, FIG. 1 is a block diagram 100 describing an exemplary architecture of a control unit and connected devices for implementing a water conservation system according to the embodiments of the present disclosure. The control unit 102 may be connected to a plurality of user devices 130 via a network 128. As shown in FIG. 1, the control unit 102 may include processor(s) 104 and memory 106 that are communicatively coupled to each other. Further, the control unit 102 may include a database (DB) 108 that may be communicatively connected to the memory 106. Furthermore, as shown in FIG. 1, memory 106 may include a sensor management unit 110, a fire control unit 112, a communication management unit 114, a fire control unit 116, a water level detection unit 118, an irrigation control unit 120, a grey water control unit 122, a timer control unit 124 and a pump control unit 126. One or more user devices 130 may be communicatively connected to the control unit 102 via the network 128.

Components of the control unit 102 may be any combination of hardware and programming to implement the functionalities described herein. In some implementations, the programming may be processor 104 executable instructions stored on a non-transitory machine-readable storage medium (e.g., memory 106), and the hardware may include at least one processing resource to retrieve and/or execute those instructions. Processor(s) 104 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. Processor(s) 104 thus may also include the functionality to encode messages and/or data or information. Processor(s) 104 may include, among other things, a clock, an arithmetic logic unit (ALU), and logic gates configured to support the operation of processor(s) 104. Further, the processor(s) 104 may include functionality to execute one or more software programs, which may be stored in the memory 106 or otherwise accessible to processor(s) 104.

Memory 106 may store any number of pieces of information, and data, used by the system to implement the functions of the system. The memory 106 may include, for example, volatile memory and/or non-volatile memory. Examples of volatile memory may include but are not limited to volatile random-access memory (RAM). The non-volatile memory may additionally or alternatively comprise an electrically erasable programmable read-only memory (EEPROM), flash memory, hard drive, and the like. Some examples of volatile memory include, but are not limited to, dynamic RAM, static RAM, and the like. Some examples of the non-volatile memory includes, but are not limited to, hard disks, magnetic tapes, optical disks, programmable read-only memory, erasable programmable read-only memory, electrically erasable programmable read-only memory, flash memory, and the like. Memory 106 may be configured to store information, data, applications, instructions, or the like for enabling the system to carry out various functions in accordance with various example embodiments. Additionally, or alternatively, the memory 106 may be configured to store instructions which when executed by processor(s) 104 cause the surveillance management system 102 to behave in a manner as described in various embodiments.

The network 128 may be a wireless network, a wired network, or a combination thereof. Network 128 may be implemented as one of the several types of networks, such as intranet, local area network (LAN), wide area network (WAN), the internet, and the like. Network 128 may either be a dedicated network or a shared network. The shared network represents an association of the several types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 128 may include a variety of network devices, including routers, bridges, servers, computing devices, storage devices, and the like.

In one example, the user device 130 may be an electronic device capable of communicating with the control unit via the network 128. Examples of user devices 130 may include personal computers, laptops, smartphones, smart wearables, and the like. Users may be able to monitor and control the operations of the water conservations system by sending instructions and receiving information from the control unit. The water conservation system may be implemented by means of a hardware logic, a software code programmed into a hardware device, or by a combination of both. In one example, the system may comprise a control unit and may include one or more processors communicatively coupled with a memory and a database. A program code maybe loaded into the memory that performs various functions related to water conservation.

During operation, the sensor management unit 110 may continuously receive data generated by the plurality of sensors in real-time. The solenoid valve control unit 112 may be configured to monitor the status of and control the working of each of the plurality of solenoid valves. The communication management unit 114 may assist users to communicate with the control unit. Operational instructions such as irrigation schedule and override instructions may be sent to the control unit 102 by users via the connected user devices 130 with the assistance of the communication management unit 114.

The fire control unit 116 may monitor data received from temperature sensors and aids in overriding every other operation to prioritize fire management upon detecting unusual rise in temperature in any fire zone. The water level detection unit 118 determines water levels in the grey water tank and further determines amount of water to be disposed from water outlet points for irrigation based on the irrigation schedule working alongside the irrigation control unit 120. The grey water control unit 122 manages the storage and disposal of grey water in the grey water tank. Time timer control unit 124 receives operational instructions and schedules of irrigation outlets and manages their operation. The pump control unit 126 manages the working of the pumps that pump water from the city water source and the grey water tank to different water outlets.

While the proposed solution works in almost all areas and geographies, it may be more suited for urban areas where a lot of water wastage (such as wastage from laundry) occurs and the availability of fresh water is scarce and critical.

Figure 2:
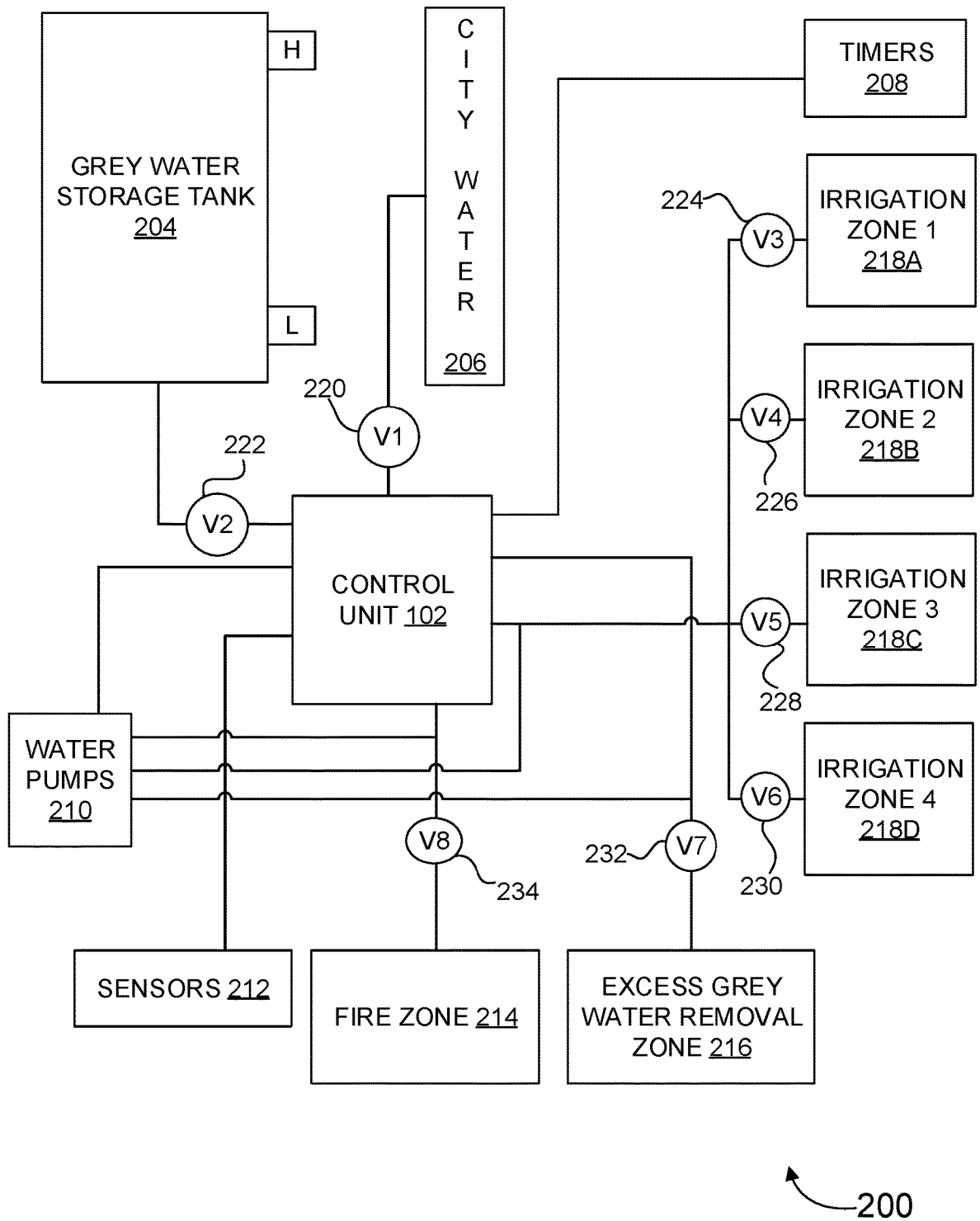
FIG. 2 is an exemplary illustration of the core components of the water conservation system according to the embodiments of the present disclosure.

FIG. 2 is an exemplary illustration 200 of the core components of the water conservation system according to the embodiments of the present disclosure. The system comprises of the control unit 102 that is interfaced with components such as a plurality of solenoid valves (V1-V8), grey water storage tank 204, city water source 206, timers 208, water pumps 210, and sensors 212. Zones covered by the system include a fire zone 214, an excess grey water removal zone 216, and irrigation zones (218A, 218B, 218C, and 218D).

The solenoid valve V1 220 may be disposed between the control unit 102 and the city water 206. The solenoid valve V2 222 may be disposed between the control unit 102 and the grey water storage tank 204.

The solenoid valve V3 224 may be disposed between the control unit 102 and the irrigation zone 1 218A. The solenoid valve V4 226 may be disposed between the control unit 102 and the irrigation zone 2 218B. The solenoid valve V5 228 may be disposed between the control unit 102 and the irrigation zone 3 218C. The solenoid valve V6 230 may be disposed between the control unit 102 and the irrigation zone 4 218D. It may be noted that the illustration provided herein merely has four irrigation zones. The number of irrigation zones described herein is merely for the purpose of illustration and does not limit the scope of the present disclosure. Any number of irrigation zones may be covered by the present disclosure by merely scaling the system as understood by a person skilled in the art.

The solenoid valve V7 232 may be disposed between the control unit 102 and the excess grey water removal zone 216. The solenoid valve V8 234 may be disposed between the control unit 102 and the fire zone 214.

Water pumps 210 may be used by the control unit 102 to route water from the grey water storage tank 204 and/or the city water source 206 to the fire zone 214, excess grey water removal zone 216, and/or the irrigation zones. The grey water storage tank 204 may be equipped with high level and low level detection sensors that provide appropriate signals to the control unit 102. The control unit 102 may be capable of controlling water flow from the grey water storage tanks/city water source to various outlets via the solenoid valves V1-V8. The control unit may be programmed to work according to a logic wherein the solenoid valves V1-V8 are managed by the control unit depending on various use cases, sensor data, and water levels. The grey water storage tank 204 may have sensors to detect high level of water and low level of water. The control unit 102 may receive data from these sensors continuously. Further, the timers 208 and the sensors 212 may continuously send data regarding irrigation schedule/status and the temperature levels.

Figure 3:
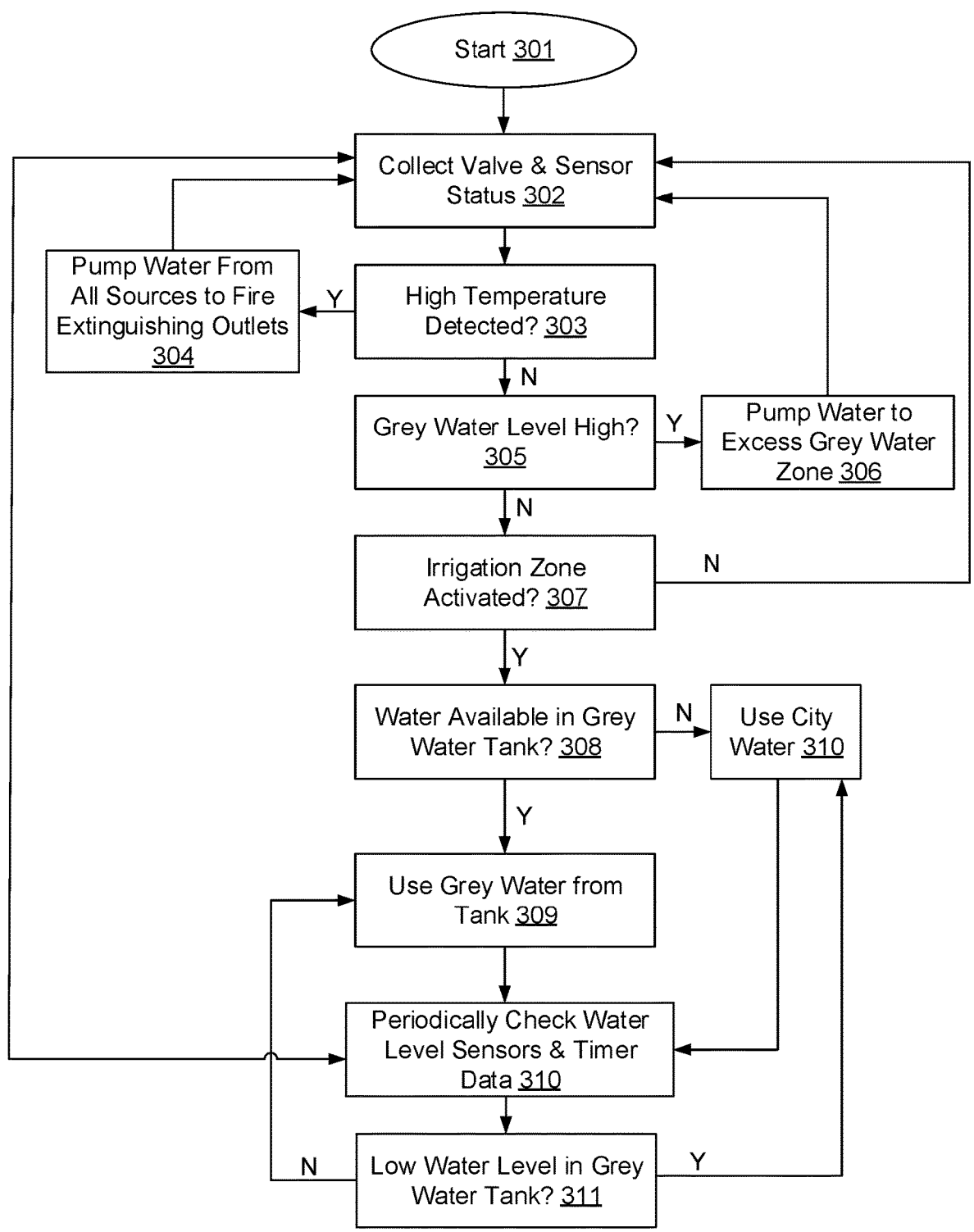
FIG. 3 is an exemplary flow diagram depicting the working of the water conservation system according to the embodiments of the present disclosure.

Various control flows relating to various use cases are described by the flow diagram depicted in FIG. 3. FIG. 3 is an exemplary flow diagram 300 depicting the working of the water conservation system according to the embodiments of the present disclosure. Once the system initiates, the control unit 102 may start receiving status data from all the valves and connected sensors as described earlier. The critical function here is high-temperature detection. Hence, highest priority may be provided for temperature detection and fire control. It may be noted that the flow may be modified depending on the use case as understood by a person skilled in the art. New blocks may be added or some blocks may be deleted from the flow diagram depending upon the use case.

The system initiates at 301 and collects sensor and valve-related status at 302. At 303, the system evaluates if high-temperature is detected at any particular zone. If yes, the control moves to 304 wherein, the system pumps water to the water outlets close to the fire zone by activating solenoid valve V8 234. In one example, depending upon the area of temperature variation, the system may be capable of opening any solenoid valve for the purpose of disbursing water from those outlets. Moreover, during critical situations, water from either one or both the inlets may be pumped to the respective outlets by the control unit 102. The control moves to 302 at defined intervals from 304 to determine if the process is to be continued or stopped. At 305, the system checks if the water level is high in the tank by evaluating the data received from the high water level sensor of the grey storage water tank 204. If yes, control moves to 306 wherein water from the grey water storage tank 204 may be pumped to excess grey water removal zone by turning on Solenoid Valve V7 232. This zone may be adapted to receive excess grey water if the water level is too high. The control moves to 302 all over again to detect the status at defined intervals and proceeds accordingly.

At 307, the system determines if any irrigation zone is to be attended based on the irrigation schedule received from the timer 208. If yes, the system is supposed to route water to the irrigation zones. The control unit 102 may activate either Solenoid Valve V1 or Solenoid Valve V2 and pump water to those zones. Further, one or more solenoid valves V3-V6 may be activated to route the pumped water to irrigation zones 1-4. If no zones are activated by the timer, the control moves to 302. Else, the control moves to 308 where the system checks if grey water is available. Herein, first preference is provided for using grey water thereby avoiding usage of city water. If grey water is available, the control moves to 309 wherein grey water is pumped from grey water tanks to the activated irrigation zones. If not, the control moves to 310 wherein city water may be used.

Once the disbursal of water is initiated, the system periodically checks for: (i) water levels in the grey water storage tank; and (ii) data/instructions from 302 such as high temperature detection, activation/deactivation of irrigation zones by the timer 208, and the like. At 311, if the water level in the grey water storage tank hits the lower mark, the connection from the tank is terminated and city water is routed to the valves. The process then keeps on continuing in a loop unless stopped manually by a user or the system is shut down.

The process depicted in FIG. 3 represents generalized illustrations, and those other processes may be added, or existing processes may be removed, modified, or rearranged without departing from the scope and spirit of the present application. In addition, the processes may represent instructions stored on a computer-readable storage medium that, when executed, may cause a processor to respond, to perform actions, to change states, and/or to make decisions. Alternatively, the processes may represent functions and/or actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flowcharts illustrate functional information to design/fabricate circuits, generate programs, or use a combination of hardware and program to perform the illustrated processes.

Figure 4:
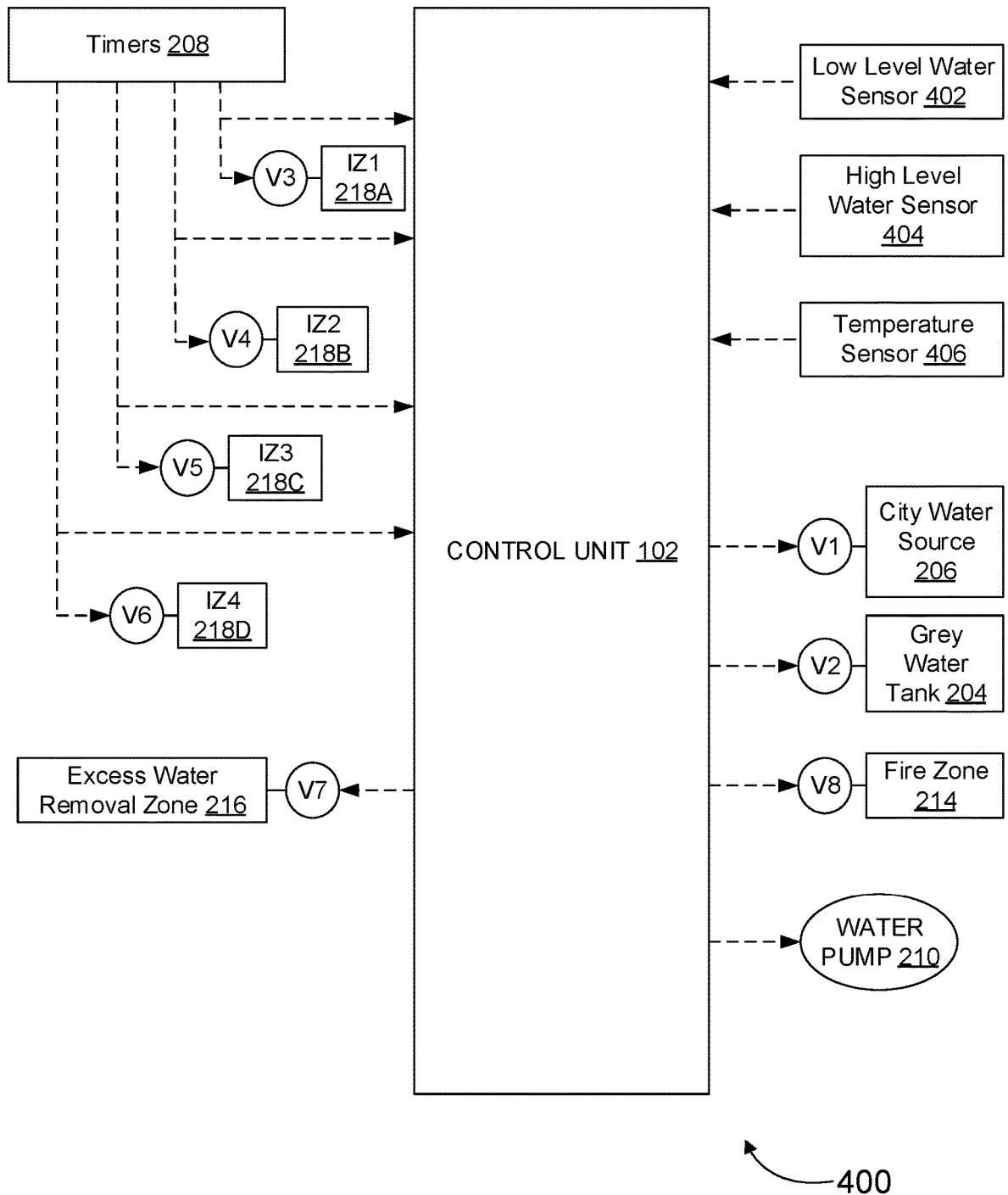
FIG. 4 is an exemplary block diagram illustrating the control flow of the water conservation system according to the embodiments of the present disclosure.

FIG. 4 is an exemplary block diagram 400 illustrating the control flow of the water conservation system according to the embodiments of the present disclosure. Herein, the timers 208 are communicatively connected to the control unit 102 to provide information regarding four exemplary irrigation zones namely IZ1, IZ2, IZ3, and IZ4. Solenoid Valves V3-V6 may be provided to control water to these zones. The timer 208 provides information regarding the operating requirements (predefined timings, amount of water to be disposed, manual requests, and the like. The control unit 102 may receive information from other sensors namely, the high water level sensor, low water level sensor, temperature sensor, and the like. Depending upon the data received and matching the use cases, the valves are actuated and water is routed accordingly. Solenoid valve V1 connects to city water source 206 and solenoid valve V2 connects to grey water storage tank 204. The solenoid valve V8 may be connected to the fire zone 214. The control unit 102 may be interfaced with water pumps 210 for routing water to various water outlet points. Solenoid valve V7 may be connected to excess grey water removal zone 216.

Figure 5:
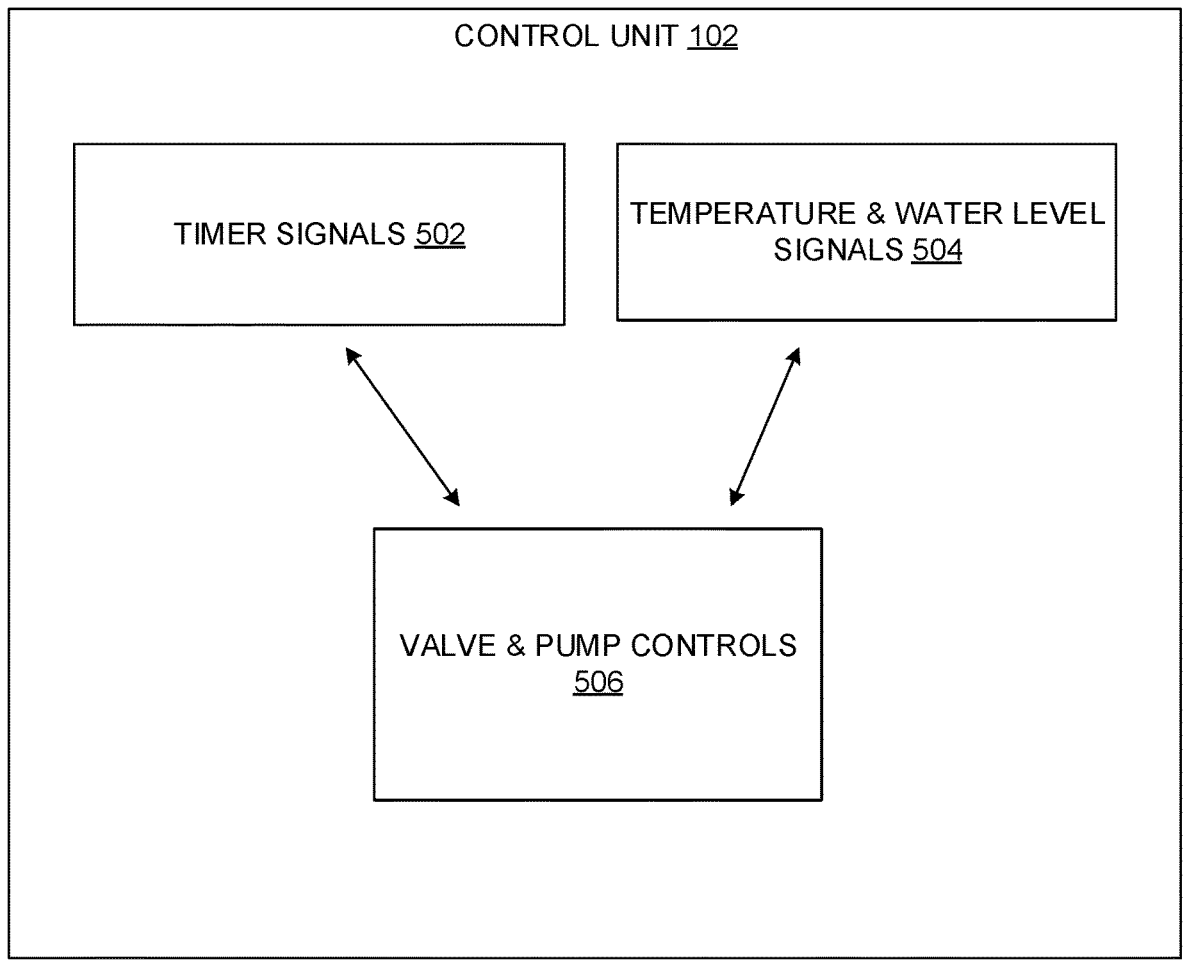
FIG. 5 is an exemplary block diagram illustrating the primary components of the control unit for implementing the water conservation system according to the embodiments of the present disclosure.

FIG. 5 is an exemplary block diagram 500 illustrating the primary components of the control unit for implementing the water conservation system according to the embodiments of the present disclosure. The control unit 102 may be built as a hardware unit wherein printed circuit boards (PCBs) are used to mount various components such as processors, memory, database, and other control ports. In one example, a first PCB may comprise components for managing timer signals. This is represented by the block timer signals 502. A second PCB may be configured with components for receiving temperature data and water level data. This is represented by the block 504. A third PCB may be fitted with components for managing the controls of the valves and the pump. This is represented by block 506. The components of the PCBs may communicate with each other and work together as a unit to form the control unit 102.

The techniques disclosed herein may be implemented in small and large apartments and in homes/offices with gardens. The system may be best suited in urban areas where grey water is not utilized effectively. The system may also be beneficial in areas which have issues related to water shortage. The system may be adapted to different scales depending upon the use case as understood by a person skilled in the art.

The features and advantages listed in the previous sections of the document illustrate the various technical advancements provided by the present invention in solving the technical problems faced in this field of invention. It may be noted that the present disclosure covers obvious modifications of the abovementioned ideas and concepts that are similar and related as understood by a person ordinarily skilled in the art.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications, and changes may be made without departing from the spirit of the present solution. All the features disclosed in this specification (including any accompanying drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or an appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter.

What is claimed is:

1. A water conservation system comprising:
   a plurality of solenoid valves, a plurality of water outlet points, at least one grey water tank, water pumps, a plurality of timers, and a plurality of sensors including water level sensors, temperature sensors, solenoid valve sensors, and pump control sensors; and
   a control unit comprising a memory and a processor coupled to the memory, wherein the control unit:
   receives operating status of the plurality of solenoid valves, the plurality of water outlet points, and the water pumps;
   receives data generated by the plurality of timers and the plurality of sensors;
   processes the received data and operating status to determine an operation to be performed by the control unit, wherein the operation includes fire control, excess grey water removal, or standard irrigation;
   upon determining that the operation is fire control:
      determines a fire zone based on the data received from the temperature sensors; and
      routes water from the grey water tank and a city water source to water outlet points disposed at the fire zone by activating a first combination of solenoid valves and water pumps;
   upon determining that the operation is excess grey water removal:
      routes excess water from the grey water tank to water outlet points disposed at an excess water removal zone by activating a second combination of solenoid valves and water pumps; and
   upon determining that the operation is standard irrigation:
      determines a time period for irrigation based on the data received from the plurality of timers and water levels in the grey water tank;
      routes water from the grey water tank to the water outlets points disposed at an irrigation zone for the determined time period by activating a third combination of solenoid valves and water pumps until water level in the grey water tank is low; and
      routes water from the city water source to the water outlet points disposed at the irrigation zone for the determined time period by activating a fourth combination of solenoid valves and water pumps upon determining that the water level in the grey water tank is low.

2. The water conservation system of claim 1, wherein the one or more grey water tanks are equipped with water level sensors to determine the amount of grey water present in the one or more grey water tanks.

3. The water conservation system of claim 1, wherein the plurality of timers comprise data related to irrigation schedules for standard irrigation operation.

4. The water conservation system of claim 3, wherein the irrigation schedule comprises time periods through which a set of water outlet points from the plurality of water outlet points are to be activated.

5. The water conservation system of claim 1, wherein the control unit activates and deactivates the plurality of solenoid values using the solenoid valve sensors.

6. The water conservation system of claim 1, wherein the control unit activates and deactivates the water pumps using the pump control sensors.

7. The water conservation system of claim 1, wherein the temperature sensors continuously send temperature data from one or more monitoring zones to the control unit.

8. The water conservation system of claim 1, wherein the first combination of solenoid valves and water pumps include solenoid valves connecting the water outlets disposed at the fire zone and water pumps connected to the one or more grey water tanks and the city water source, and wherein the second combination of solenoid valves and water pumps include solenoid valves connecting the water outlets disposed at the excess grey water removal zone and pumps connected to the one or more grey water tanks, and wherein the third combination of solenoid valves and water pumps include solenoid valves connecting the water outlets disposed at the irrigation zone and pumps connected to the one or more grey water tanks, and wherein the fourth combination of solenoid valves and water pumps include solenoid valves connecting the water outlets disposed at the irrigation zone and pumps connected to the city water source.

9. A method for grey water conservation, comprising:
receiving, by a control unit comprising a memory and a processor coupled to the memory, operating status of a plurality of solenoid valves, a plurality of water outlet points, and water pumps;
receiving, by the control unit, data generated by a plurality of timers and a plurality of sensors, wherein the plurality of sensors include water level sensors, temperature sensors, solenoid valve sensors, and pump control sensors;
processing, by the control unit, the received data and operating status to determine an operation, wherein the operation includes fire control, excess grey water removal, or standard irrigation upon determining that the operation is fire control:
determining, by the control unit, a fire zone based on the data received from the temperature sensors;
and routing, by the control unit, water from one or more grey water tanks and a city water source to water outlet points disposed at the fire zone by activating a first combination of solenoid valves and water pumps;
upon determining that the operation is excess grey water removal:
routing, by the control unit, excess water from the one or more grey water tanks to water outlet points disposed at an excess water removal zone by activating a second combination of solenoid valves and water pumps; and
upon determining that the operation is standard irrigation:
determining, by the control unit, water levels in the one or more grey water tanks and a time period for irrigation based on the data received from the plurality of timers and;
routing, by the control unit, water from the one or more grey water tanks to the water outlets points disposed at an irrigation zone for the determined time period by activating a third combination of solenoid valves and water pumps until water levels in the one or more grey water tanks is low; and routing, by the control unit, water from the city water source to the water outlet points disposed at the irrigation zone for the determined time period by activating the fourth combination of solenoid valves and water pumps upon determining that the water levels in the one or more grey water tanks is low.

10. The method of grey water conservation of claim 9, wherein the one or more grey water tanks are equipped with water level sensors to determine the amount of grey water present in the one or more grey water tanks.

11. The method of grey water conservation of claim 9, wherein the plurality of timers comprise data related to irrigation schedules for standard irrigation operation.

12. The method of grey water conservation of claim 11, wherein the irrigation schedule comprises time periods through which a set of water outlet points from the plurality of water outlet points are to be activated.

13. The method of grey water conservation of claim 9, wherein the control unit activates and deactivates the plurality of solenoid values using the solenoid valve sensors.

14. The method of grey water conservation of claim 9, wherein the control unit activates and deactivates the water pumps using the pump control sensors.

15. The method of grey water conservation of claim 9, wherein the temperature sensors continuously send temperature data from one or more monitoring zones to the control unit.

16. The method of grey water conservation of claim 9, wherein the first combination of solenoid valves and water pumps include solenoid valves connecting the water outlets disposed at the fire zone and water pumps connected to the one or more grey water tanks and the city water source, and wherein the second combination of solenoid valves and water pumps include solenoid valves connecting the water outlets disposed at the excess grey water removal zone and pumps connected to the one or more grey water tanks, and wherein the third combination of solenoid valves and water pumps include solenoid valves connecting the water outlets disposed at the irrigation zone and pumps connected to the one or more grey water tanks, and wherein the fourth combination of solenoid valves and water pumps include solenoid valves connecting the water outlets disposed at the irrigation zone and pumps connected to the city water source.

* * * * *